(12) United States Patent
Finco

(10) Patent No.: US 10,337,795 B2
(45) Date of Patent: Jul. 2, 2019

(54) DRYING MACHINE FOR PASTY AND/OR GRANULAR SUBSTANCES AND SPACER FOR ROLLERS OF CONVEYOR BELTS FOR SUCH DRYING MACHINE

(71) Applicant: OFFICINE FACCO & C. S.P.A., Campo San Martino, Frazione Marsango (IT)

(72) Inventor: Massimo Finco, Padua (IT)

(73) Assignee: OFFICINE FACCO & C. S.P.A., Frazione Marsango (IT)

( * ) Notice: Subject to any disclaimer, the term of this patent is extended or adjusted under 35 U.S.C. 154(b) by 235 days.

(21) Appl. No.: 15/326,772

(22) PCT Filed: Jul. 15, 2015

(86) PCT No.: PCT/EP2015/066132
§ 371 (c)(1),
(2) Date: Jan. 17, 2017

(87) PCT Pub. No.: WO2016/008909
PCT Pub. Date: Jan. 21, 2016

(65) Prior Publication Data
US 2017/0211883 A1  Jul. 27, 2017

(30) Foreign Application Priority Data

Jul. 17, 2014  (IT) .............................. PD2014A0194

(51) Int. Cl.
*B65G 15/00*  (2006.01)
*B65G 37/00*  (2006.01)
(Continued)

(52) U.S. Cl.
CPC .............. *F26B 17/08* (2013.01); *B65G 15/00* (2013.01); *B65G 37/00* (2013.01); *B65G 39/07* (2013.01);
(Continued)

(58) Field of Classification Search
CPC ........ F26B 17/08; F26B 25/002; F26B 25/20; F26B 2200/12; B65G 39/07; B65G 39/00
(Continued)

(56) References Cited

U.S. PATENT DOCUMENTS

| 1,370,513 A | * | 3/1921 | Boswell | .............. F26B 11/0477 |
| | | | | 34/136 |
| 1,511,400 A | * | 10/1924 | Daly | ..................... F26B 13/101 |
| | | | | 34/392 |

(Continued)

FOREIGN PATENT DOCUMENTS

| AT | 412277 B | * | 12/2004 | ................ F26B 1/00 |
| CA | 3002779 A1 | * | 4/2017 | ............... A21B 1/26 |

(Continued)

OTHER PUBLICATIONS

International Search Report and Written Opinion dated Sep. 17, 2015 issued in PCT/EP2015/066132.

(Continued)

*Primary Examiner* — Stephen M Gravini
(74) *Attorney, Agent, or Firm* — Scully, Scott, Murphy & Presser, P.C.

(57) ABSTRACT

A drying machine for pasty and/or granular substances, which comprises a supporting frame for a plurality of superimposed conveyor belts, the frame being provided with lateral openings for the passage of air, each conveyor belt being supported by a plurality of spaced rollers which are pivoted to the frame, the rollers being surrounded by spacers which are adapted to define, between the rollers and the belt, air passage spaces to optimize the drying of the conveyed substances, each roller being surrounded by a single helical body with spaced turns that define the air passage space between the roller and the belt.

8 Claims, 3 Drawing Sheets

(51) Int. Cl.
  *B65G 39/07* (2006.01)
  *F26B 17/08* (2006.01)
  *F26B 25/00* (2006.01)
  *F26B 25/20* (2006.01)
(52) U.S. Cl.
  CPC ............ *F26B 25/002* (2013.01); *F26B 25/20* (2013.01); *F26B 2200/12* (2013.01)
(58) Field of Classification Search
  USPC .......................................................... 34/207
  See application file for complete search history.

(56) References Cited

U.S. PATENT DOCUMENTS

| | | | | |
|---|---|---|---|---|
| 2,044,744 | A * | 6/1936 | Hansen | F26B 15/143 19/66 R |
| 2,801,733 | A | 8/1957 | Evert | |
| 3,218,727 | A * | 11/1965 | Lind | F26B 5/06 34/236 |
| 4,448,301 | A * | 5/1984 | Alger | B65G 21/18 198/778 |
| 4,832,186 | A | 5/1989 | Conrad | |
| 5,070,365 | A | 12/1991 | Agarwal | |
| 5,558,208 | A * | 9/1996 | Kucharski | B65G 17/064 198/778 |
| 5,682,683 | A * | 11/1997 | Haimer | A01D 43/003 34/210 |
| 6,105,273 | A * | 8/2000 | Johanson | B01J 8/08 34/267 |
| 6,173,508 | B1 * | 1/2001 | Strohmeyer, Jr. | F02C 6/18 34/578 |
| 7,073,274 | B2 * | 7/2006 | Yoshida | F26B 13/103 101/424.1 |
| 7,694,432 | B2 * | 4/2010 | Eriksson | F26B 3/283 110/245 |
| 10,036,592 | B2 * | 7/2018 | Chen | F26B 11/00 |
| 10,099,859 | B2 * | 10/2018 | Bogle | B65G 21/18 |
| 10,113,795 | B2 * | 10/2018 | Hoffman, Jr. | F26B 3/30 |
| 2004/0011627 | A1 * | 1/2004 | Palmaer | B65G 17/086 198/778 |
| 2006/0266623 | A1 * | 11/2006 | Heber | B65G 17/064 198/778 |
| 2013/0270074 | A1 * | 10/2013 | Malmberg | B65G 17/063 198/850 |
| 2017/0211883 | A1 * | 7/2017 | Finco | B65G 39/07 |

FOREIGN PATENT DOCUMENTS

| | | | | |
|---|---|---|---|---|
| EP | 1473533 | A3 * | 5/2008 | ............. F26B 1/00 |
| EP | 3169960 | A1 * | 5/2017 | ............. B65G 39/07 |
| FR | 574670 | A | 7/1924 | |
| FR | 1235427 | A | 7/1960 | |
| NL | 9400025 | A | 8/1995 | |
| WO | WO 2016008909 | A1 * | 1/2016 | ............. B65G 39/07 |

OTHER PUBLICATIONS

"Manure Treatment—MDS11", Facco Poultry Equipment, Sep. 8, 2011, XP055174711, Retrieved from the Internet: URL:http://web.archive.org/web/20130802103 036/http://www.facco.net/index-e.htm.

* cited by examiner

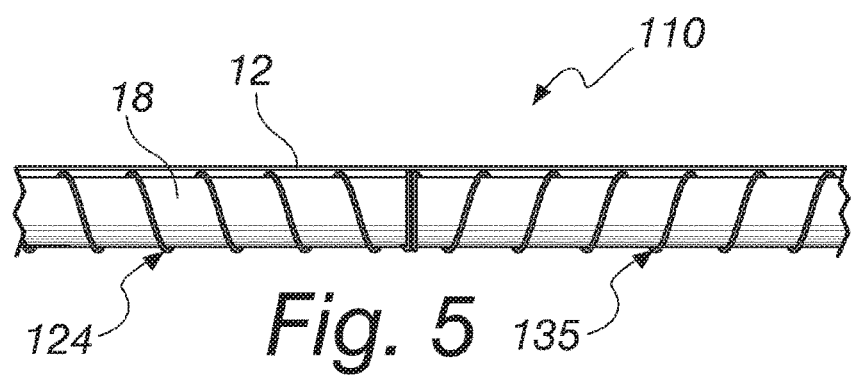

DRYING MACHINE FOR PASTY AND/OR GRANULAR SUBSTANCES AND SPACER FOR ROLLERS OF CONVEYOR BELTS FOR SUCH DRYING MACHINE

The present invention relates to a drying machine for pasty and/or granular substances.

The machine is particularly, but not exclusively, adapted to the treatment of litter by a poultry farm system.

The invention also relates to a spacer for rollers of conveyor belts of drying machines for treating litter in poultry farm systems.

Nowadays drying systems are known for the treatment of litter from poultry farm systems.

Such systems are adapted to dry the litter in poultry farm systems by way of using the existing ventilation system in the sheds and, if necessary, using other, independent fans.

Such system can be installed in a specially adapted room (a tunnel) or in an existing room in the poultry shed.

Such apparatus comprises: means of removing the litter from the poultry batteries and means of transferring the humid litter to a drying machine.

Usually a drying machine for treating litter in a poultry farm system comprises a frame for supporting a plurality of superimposed levels of a perforated conveyor belt, such frame being provided with lateral openings for the passage of air, each conveyor belt being supported by a plurality of spaced rollers which are pivoted to the frame; each roller is surrounded by spacers which are adapted to define, between the roller and the belt, an air passage space for optimizing the drying of the litter conveyed.

The fresh litter is loaded onto the upper part of the frame and unloaded from the lowest level, in order to be transferred to a storage area. This system makes it possible to obtain a dry final product which is easy to transport and which has all the qualities of an organic fertilizer.

The fresh litter is unloaded into a distribution system which lays it uniformly on the perforated belt. The belts installed in the various levels of the system are perforated so as to allow air to pass through the layer of litter.

The number of levels and the length of the tunnel is dimensioned on the basis of the number of head of poultry in the shed.

The litter is dried by the air expelled by the fans of the shed.

The air is blown through a perforated wall and then passes through the perforated belts of the drying tunnel.

The spacers, which are adapted to define an air passage space between the roller and the belt for optimizing the drying of the litter conveyed, are for each roller constituted by a plurality of tubular cage-like bodies, i.e. with lateral windows, which are adapted to be slid onto a roller, axially, side by side, and in abutment against each other, each tubular cage-like body having a radially-extending annular prominence which is configured to support the belt.

Such conventional spacing means, although used and appreciated, suffer a number of drawbacks.

A first drawback is constituted by the fact that such tubular cage-like bodies with radial annular prominences comprise numerous corner areas which are adapted to accommodate and collect fragments of litter and other surrounding dirt, and such buildups of dirt require time and labor in order to be removed by way of adapted operations to wash the machine, in order to prevent the formation and spread of harmful bacteria.

A second drawback is constituted by the fact that such tubular cage-like bodies need to be made by molding plastic material, thus by way of specially-made mold dies for making tubular bodies for rollers of a preset diameter.

Furthermore the assembly of such tubular cage-like bodies requires the insertion one after the other of many such tubular bodies for each roller, with expenditure of time and labor.

The aim of the present invention is to provide a drying machine for pasty and/or granular substances which is capable of overcoming the above mentioned drawbacks of the known art.

Within this aim, an object of the invention is to provide a drying machine that is simpler to clean.

Another object of the invention is to provide a drying machine in which the passage of air between the roller and the belt is better than in conventional drying machines.

Another object of the invention is to provide a drying machine that is simpler to assemble than conventional machines.

Another object of the invention is to provide a spacer for rollers of conveyor belts of drying machines for pasty and/or granular substances, which makes it possible to achieve the above aim and objects.

This aim and these and other objects which will become better apparent hereinafter are achieved by a drying machine for pasty and/or granular substances, which comprises a supporting frame for a plurality of superimposed conveyor belts, said frame being provided with lateral openings for the passage of air, each conveyor belt being supported by a plurality of spaced rollers which are pivoted to the frame, said rollers being surrounded by spacers which are adapted to define, between the rollers and the belt, air passage spaces to optimize the drying of the conveyed substances, said drying machine being characterized in that each roller is surrounded by a single helical body with spaced turns that define said air passage space between the roller and the belt.

Further characteristics and advantages of the invention will become better apparent from the description of a preferred, but not exclusive, embodiment of the drying machine according to the invention, which is illustrated by way of non-limiting example in the accompanying drawings wherein:

FIG. 5 is a schematic view of a variation of embodiment of the machine according to the invention.

Figure 1:
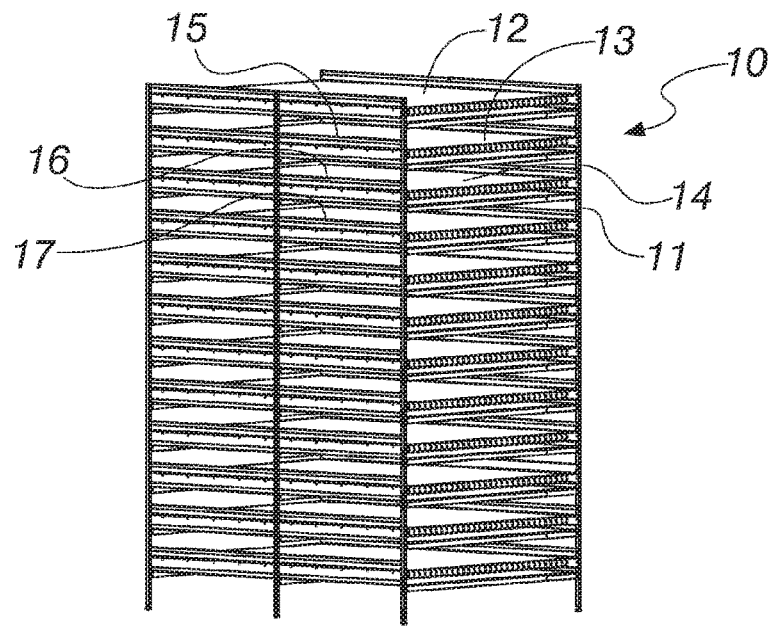
FIG. 1 is a perspective view of a drying machine according to the invention.

With reference to the figures, a drying machine for pasty and/or granular substances according to the invention is generally designated with the reference numeral 10.

Figure 2:
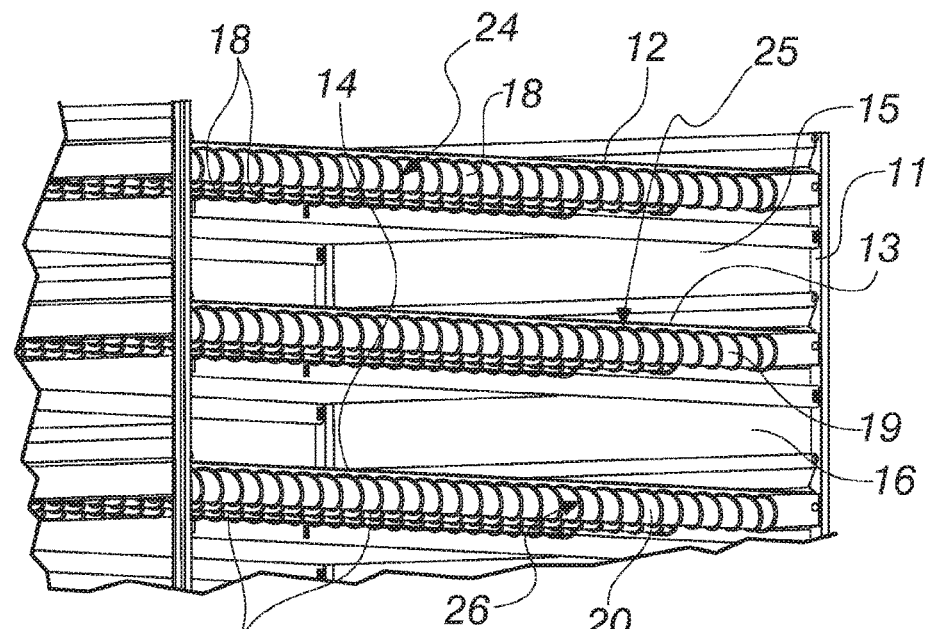
FIG. 2 is a perspective view of a portion of the drying machine.
Figure 3:
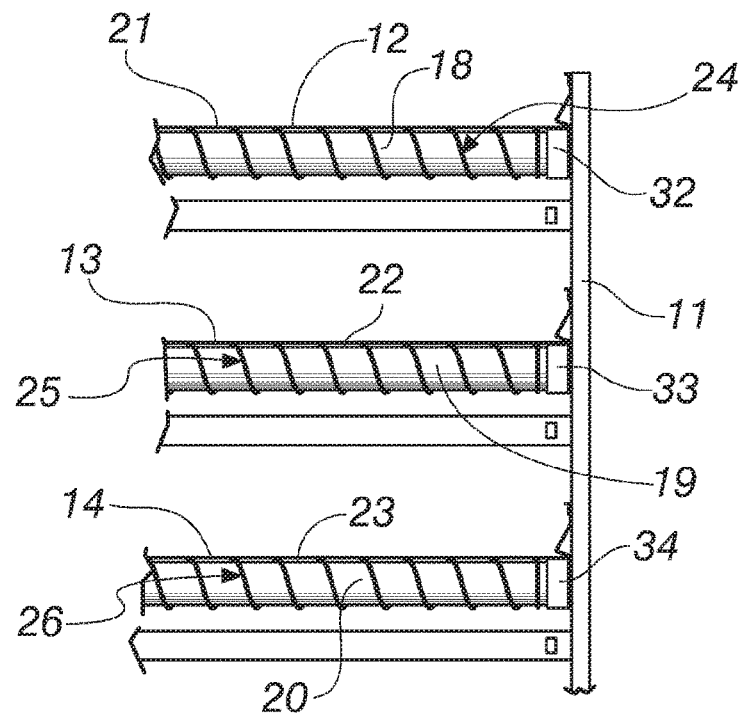
FIG. 3 is a front elevation view of a portion of the drying machine according to the invention.

The drying machine 10 comprises a frame 11 for supporting a plurality of superimposed conveyor belts, for example the belts 12, 13 and 14 indicated in FIGS. 1, 2 and 3.

The frame 11 is provided with lateral openings, for example 15, 16, 17, for the passage of air.

Each conveyor belt 12, 13, 14 is supported by a plurality of spaced rollers 18, 19, 20 respectively, which are pivoted to the frame 11.

Figure 4:
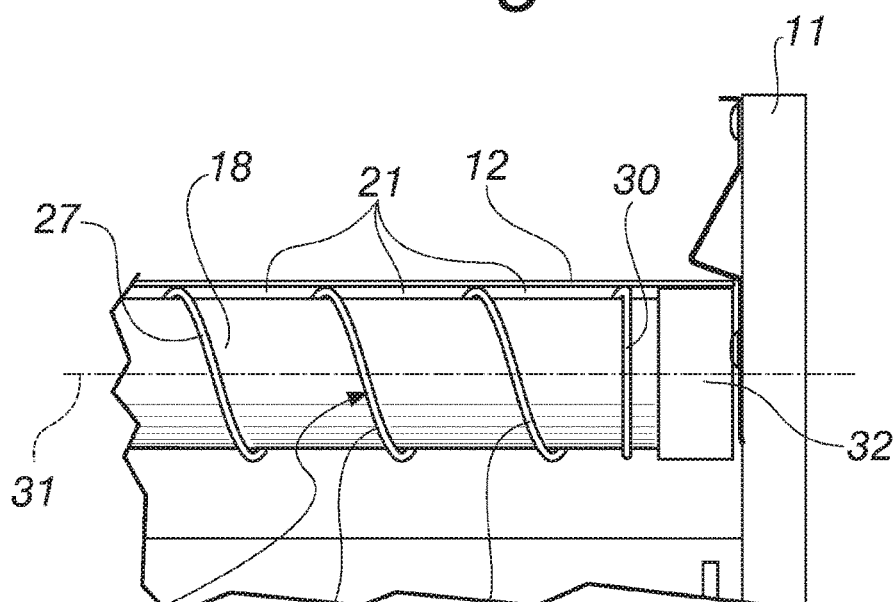
FIG. 4 is a detail of a spacer according to the invention, applied to a roller of the drying machine according to the invention.

The rollers 18, 19, 20 are surrounded by spacers which are adapted to define, between the roller and the belt, an air passage space, for example 21, 22 and 23 in FIGS. 3 and 4, for optimizing the drying of the litter conveyed.

The peculiarity of the invention consists in that each roller 18, 19, 20, is surrounded by a single helical body 24, 25, 26 with spaced turns, respectively.

The turns 27, 28, 29 and 30 of each helical body surround the corresponding roller 18, 19, 20, defining the air passage space 21, 22, 23 between the roller and the belt.

The turns 27, 28, 29 and 30 in fact support the overlying belt 12, 13 and 14, keeping it at a distance that substantially corresponds to the thickness of the turn in the radial direction with respect to the respective roller.

In particular the helical body 24, 25 and 26 is constituted by a helical spring, with end turns, for example 30 in FIG. 4, which are arranged at right angles to the rotation axis 31 of the corresponding roller 18, 19 and 20.

The opposite ends of the rollers 18, 19 and 20 bear corresponding anti-slipping spacer rings, 32, 33 and 34 in FIG. 3, which are adapted to prevent sliding contact, and thus contact with braking friction and with wear, between the end turn 30 of the helical body 24, 25 and 26 and the adjacent frame portion 11 to which the roller 18, 19 and 20 is pivoted.

In the embodiment of the invention described up to now, the helical body 24, as is 25 and 26, is shaped like a cylindrical helix and is extended longitudinally so as to affect the corresponding roller 18, 19 and 20 along its entire length except for the ends where the anti-slipping spacer rings 32, 33 and 34 are present.

The helical body 24, 25 and 26 is constituted by a helical spring made with a metallic bar, or metallic wire, with a circular cross-section, and the air passage space 21, 22 and 23 is determined by the diameter of such circular cross-section, such diameter corresponding to the minimum distance between the belt and the surface of the roller.

The helical body 24, 25 and 26 is constituted, alternatively, by a helical spring made with a metallic bar, or metallic wire, that is tubular and which therefore has an annular cross-section.

In a variation of embodiment of the invention, which is shown schematically in FIG. 5 and designated therein with the reference numeral 110, the spacer adapted to define an air passage space between the roller and the belt comprises two mutually opposite helical portions with right-handed and left-handed spirals, 124 and 135, which are joined at the center (for example butt-welded), each helical portion 124 and 135 being extended so as to affect half of the roller 18.

The mutually opposite helical portions 124 and 135 prevent the belt 12 from being deviated to one side by the friction with the turns, since they tend to drive the belt in two opposing or convergent directions, according to the assembly.

The helical portions 124 and 135 can also be provided starting from the same metallic wire.

In a further variation of embodiment of the drying machine according to the invention, not shown for the sake of simplicity, the rollers, for example the rollers 18, which support a same belt, for example the belt 12, have helical bodies 24 which are mounted so as to have an opposite winding direction from one roller to the next roller, so that the lateral deviations that may be imparted to the belt by the helical bodies, by alternating, substantially cancel each other out.

The invention also relates to a spacer for rollers of conveyor belts of drying machines 10 for treating litter in poultry farm systems.

Such spacer is constituted by a helical body with spaced turns 24, 25, 26, 124, 135, in which the turns 27, 28, 29, 30 completely or partially surround a corresponding roller 18, 19, 20.

In practice it has been found that the invention fully achieves the intended aim and objects.

In particular, with the invention a drying machine has been devised which is simpler to clean, thanks to the structural simplicity of the helical bodies that surround the rollers and support the conveyor belts, such helical bodies not having corners or gaps in which the dirt can accumulate.

Furthermore, with the invention a drying machine has been devised in which the passage of air between the roller and the belt is better than in conventional drying machines, thanks to the distance between the turns of the helical bodies.

Moreover, with the invention a drying machine has been devised which is simpler to assemble than conventional machines, since, with a single helical body that extends along the entire length of the corresponding roller, it is necessary to fit such single helical body onto the roller instead of a plurality of spacers as in the above mentioned known art.

Furthermore, with the invention a spacer has been devised for rollers of conveyor belts of drying machines, which makes it possible to achieve the above aim and objects.

The invention, thus conceived, is susceptible of numerous modifications and variations, all of which are within the scope of the appended claims. Moreover, all the details may be substituted by other, technically equivalent elements.

In practice the components and the materials employed, provided they are compatible with the specific use, and the contingent dimensions and shapes, may be any according to requirements and to the state of the art.

The disclosures in Italian Patent Application No. PD2014A000194 from which this application claims priority are incorporated herein by reference.

The invention claimed is:

1. A drying machine for pasty or granular substances, which comprises a supporting frame for a plurality of superimposed parallel conveyor belts, said frame being provided with lateral openings for the passage of air, each conveyor belt being supported by a plurality of parallel spaced rollers which are pivoted to the frame, said rollers being surrounded by spacers which are adapted to define, between the rollers and each conveyor belt, each of said conveyor belts configured to convey said substances, air passage spaces configured to dry said substances, wherein each roller of each conveyor belt is surrounded by a single helical body with spaced turns that define said air passage space between the roller and each conveyor belt.

2. The drying machine according to claim 1, wherein for each one of said rollers, said helical body is constituted by a helical spring, with end turns which are arranged at right angles to a rotation axis of the roller.

3. The drying machine according to claim 1, wherein opposite ends of the rollers bear corresponding anti-slipping spacer rings which are adapted to prevent sliding contact between an end turn of said spaced turns of the helical body and an adjacent frame portion to which each roller is pivoted.

4. The drying machine according to claim 1, wherein said helical body is shaped like a cylindrical helix and is extended longitudinally so as to affect the corresponding roller substantially along an entire length thereof.

5. The drying machine according to claim 1, wherein said spacers adapted to define an air passage space between the rollers and the belt comprise two mutually opposite helical portions with right-handed and left-handed spirals, which are joined at a center, each helix being extended so as to affect half of the rollers and being provided starting from a same metallic wire.

6. The drying machine according to claim 1, wherein the rollers that support a same belt are provided with helical bodies which are mounted so as to have an opposite winding direction from one roller to a next roller of said rollers.

7. The drying machine according to claim 1, wherein said helical body is constituted by a helical spring made with a metallic bar or metallic wire that has a solid circular cross-section.

8. The drying machine according to claim 1, wherein said helical body is constituted by a helical spring made with a metallic bar or metallic wire that is tubular and which therefore has an annular cross-section.

\* \* \* \* \*